US011630304B2

(12) United States Patent
Meijering et al.

(10) Patent No.: US 11,630,304 B2
(45) Date of Patent: Apr. 18, 2023

(54) MULTI-DEPTH DISPLAY APPARATUS

(71) Applicants: JAGUAR LAND ROVER LIMITED, Coventry (GB); CAMBRIDGE ENTERPRISE LIMITED, Cambridge (GB)

(72) Inventors: Valerian Meijering, Coventry (GB); Robert Hardy, Coventry (GB); Kun Li, Cambridge (GB); Ali Yöntem, Cambridge (GB); Daping Chu, Cambridge (GB)

(73) Assignees: JAGUAR LAND ROVER LIMITED, Coventry (GB); CAMBRIDGE ENTERPRISE LIMITED, Cambridge (GB)

( * ) Notice: Subject to any disclaimer, the term of this patent is extended or adjusted under 35 U.S.C. 154(b) by 731 days.

(21) Appl. No.: 16/465,096

(22) PCT Filed: Nov. 29, 2017

(86) PCT No.: PCT/EP2017/080872
§ 371 (c)(1),
(2) Date: May 29, 2019

(87) PCT Pub. No.: WO2018/100002
PCT Pub. Date: Jun. 7, 2018

(65) Prior Publication Data
US 2019/0317327 A1    Oct. 17, 2019

(30) Foreign Application Priority Data

Nov. 30, 2016    (GB) ...................................... 1620342

(51) Int. Cl.
*G02B 27/01*    (2006.01)

(52) U.S. Cl.
CPC ..... *G02B 27/0103* (2013.01); *G02B 27/0149* (2013.01); *G02B 27/0179* (2013.01);
(Continued)

(58) Field of Classification Search
CPC ............ G02B 27/0103; G02B 27/0179; G02B 27/0101; G02B 27/01; G02B 27/0075;
(Continued)

(56) References Cited

U.S. PATENT DOCUMENTS 7,837,361 B2 * 11/2010 Santoro ..................... F21V 3/00
362/355
2001/0013960 A1    8/2001 Popovich et al.
(Continued)

FOREIGN PATENT DOCUMENTS

EP    2 865 555 A1    4/2015
EP    2 960 095 A1    12/2015
(Continued)

OTHER PUBLICATIONS

Patents Act 1977: Combined Search and Examination Report under Sections 17 and 18(3), UKIPO Application No. GB1620338.2, May 30, 2017, 6 pp.
(Continued)

*Primary Examiner* — Stephone B Allen
*Assistant Examiner* — Jyotsna V Dabbi
(74) *Attorney, Agent, or Firm* — McCoy Russell LLP

(57) ABSTRACT

An imaging system includes an image realisation device and projection optics for rendering a display image on a display screen. The image realisation device includes a first image realisation surface tilted relative to an optical axis such that a first point in a first region of the image realisation surface is at a first distance from the focal point of the projection optics and a second point in a second region of the image realisation surface is at a second different distance from the
(Continued)

focal point of the projection optics. A first source image formed on the first region and projected through the projection optics renders the first display image on the display screen at a first apparent depth, and a second source image formed on the second region and projected through the projection optics renders the second display image on the display screen at a second apparent depth.

20 Claims, 7 Drawing Sheets

(52) U.S. Cl.
CPC ............ *G02B 2027/0127* (2013.01); *G02B 2027/0185* (2013.01)

(58) Field of Classification Search
CPC .... G02B 2027/0185; G02B 2027/0127; G02B 5/02; G02B 5/0205; G02B 5/0221; G02B 5/0215; G02B 5/0263; G02B 5/0273; G02B 5/0252; H04N 13/344; H04N 13/395; H04N 5/7408; H04N 5/7416
USPC .......................................................... 359/13
See application file for complete search history.

(56) References Cited

U.S. PATENT DOCUMENTS

| | | | |
|---|---|---|---|
| 2002/0135673 A1* | 9/2002 | Favalora ............... | G02B 30/00 348/42 |
| 2004/0085643 A1 | 5/2004 | Ishikawa et al. | |
| 2004/0109136 A1* | 6/2004 | Okamoto ........... | G02B 27/0172 351/211 |
| 2005/0179868 A1 | 8/2005 | Seo et al. | |
| 2008/0018641 A1 | 1/2008 | Sprague et al. | |
| 2008/0265150 A1 | 10/2008 | Holmes | |
| 2012/0188791 A1* | 7/2012 | Voloschenko ....... | G02B 6/0055 362/606 |
| 2013/0242404 A1 | 9/2013 | Kobayashi | |
| 2014/0036374 A1 | 2/2014 | Lescure et al. | |
| 2015/0061976 A1 | 3/2015 | Ferri | |
| 2015/0222884 A1* | 8/2015 | Cheng .................. | H04N 13/395 348/55 |
| 2016/0124295 A1 | 5/2016 | Montgomery | |
| 2016/0187666 A1 | 6/2016 | Manns et al. | |
| 2016/0209647 A1 | 7/2016 | Fürsich | |
| 2016/0260258 A1 | 9/2016 | Lo et al. | |
| 2016/0277725 A1 | 9/2016 | Ellsworth et al. | |
| 2017/0261746 A1* | 9/2017 | Tam ..................... | H04N 13/332 |
| 2017/0349098 A1* | 12/2017 | Uhm .................... | G08G 1/0967 |

FOREIGN PATENT DOCUMENTS

| | | |
|---|---|---|
| WO | WO 2006/061959 A1 | 6/2006 |
| WO | WO 2015/019567 A1 | 2/2015 |
| WO | WO 2015/134738 A1 | 9/2015 |
| WO | WO 2015/173556 A1 | 11/2015 |
| WO | WO 2015/184409 A1 | 12/2015 |
| WO | WO 2016/027706 A1 | 2/2016 |
| WO | WO 2016/052186 A1 | 4/2016 |
| WO | WO 2016/105521 A1 | 6/2016 |

OTHER PUBLICATIONS

International Search Report and Written Opinion of the International Searching Authority, International Application No. PCT/EP2017/080870, May 28, 2018, 22 pp.

Patents Act 1977: Combined Search and Examination Report under Sections 17 and 18(3), UKIPO Application No. GB1620340.8, May 30, 2017, 6 pp.

International Search Report and Written Opinion of the International Searching Authority, International Application No. PCT/EP2017/080873, Apr. 5, 2018, 16 pp.

Patents Act 1977: Combined Search and Examination Report under Sections 17 and 18(3), UKIPO Application No. GB1620341.6, May 12, 2017, 5 pp.

International Search Report and Written Opinion of the International Searching Authority, International Application No. PCT/EP2017/080933, Mar. 13, 2018, 16 pp.

Patents Act 1977: Combined Search and Examination Report under Sections 17 and 18(3), UKIPO Application No. GB1620342.4, May 15, 2017, 5 pp.

International Search Report and Written Opinion of the International Searching Authority, International Application No. PCT/EP2017/080872, Feb. 5, 2018, 14 pp.

* cited by examiner

MULTI-DEPTH DISPLAY APPARATUS

RELATED APPLICATIONS

This application is a 35 U.S.C. § 371 national stage application of PCT Application No. PCT/EP2017/080872, filed on Nov. 29, 2017, which claims priority from Great Britain Patent Application No. 1620342.4, filed on Nov. 30, 2016, the contents of which are incorporated herein by reference in their entireties. The above-referenced PCT International Application was published in the English language as International Publication No. WO 2018/100002 A1 on Jun. 7, 2018.

TECHNICAL FIELD

The present disclosure relates to a 3-D augmented reality display system. Particularly, but not exclusively, the disclosure relates to an apparatus for creating and projecting multi-depth images onto a display, such as a windscreen, for use in a vehicle. Aspects of the invention relate to an apparatus for projecting multi-depth, or 3D images onto a windscreen.

BACKGROUND

Heads-up displays (HUDs) are known displays where images are projected onto a transparent surface, such as a windscreen. Such displays are well known in a number of different environments including in vehicles.

In automotive HUDs information regarding car conditions (speed etc.) or navigation is displayed onto the windscreen. Such displays are typically limited in size and project the image at a fixed depth to the user. Due to the limited size, the HUD may be cluttered with information that is less relevant to the user taking up real estate. Furthermore, as the image is of a fixed depth all information presented to the user is given equally prominence. This further reduces the efficiency of such displays.

A further consideration is that in vehicles there is typically limited physical space in which such systems can be installed. Typically, such systems must be incorporated into existing spaces present in a vehicle, or installed in as small a space as possible to minimise the need to remove and reinstall existing components. Furthermore, in such systems there is a cost associated with the introduction and installation.

SUMMARY OF THE INVENTION

Aspects and embodiments of the invention provide a system, a vehicle and a method as claimed in the appended claims.

In accordance to an aspect of the invention, there is provided an imaging system for generating multi-depth virtual images on a display screen, the imaging system comprising: an image realisation device for forming a source image, projection optics for rendering a display image on the display screen, wherein the display image is a virtual image corresponding to the source image, the projection optics having an optical axis, and wherein the image realisation device comprises: a first image realisation surface, wherein the image realisation surface is an extended surface tilted relative to the optical axis such that a first point in a first region of the image realisation surface is at a first distance from the focal point of the projection optics and a second point in a second region of the image realisation surface is at a second different distance from the focal point of the projection optics, and a first source image formed on the first region and projected through the projection optics will render the first display image on the display screen at a first apparent depth and a second source image formed on the second region and projected through the projection optics will render the second display image on the display screen at a second apparent depth.

Optionally the image realisation surface is translatable along the optical axis of the projection optics. By providing an addition range of movement along the optical axis, the distance at which the real image is formed from the focal point of the projection optics may be more finely controlled.

Optionally the image realisation surface is rotatable/tiltable relative to the optical axis of the projection optics. Introducing a tilt into the image realisation surface allows for images formed on different parts of the surface to be at a continuous range of different distances from the focal point of the projection optics.

Optionally the image realisation surface is capable of generating the first image. This eliminates the need for external image generation means, providing for a compact system with fewer components.

Optionally the image realisation surface comprises an electroluminescent layer. Such layers are capable of being activated by the application of current, which can be localised, modulated as desired.

Optionally the image realisation surface comprises an organic light-emitting diode. These can be used to provide a flexible, multi-colour display.

Optionally the image realisation surface is a flat surface having a constant tilt relative to the optical axis.

Optionally the image realisation surface comprises a plurality of discrete regions.

Optionally each region of the image realisation surface is at a different angle to the optical axis to that of one or more of the other regions.

Optionally the image realisation surface has first, second and third regions wherein the first and third region are substantially perpendicular to the optical axis.

Optionally the second region is arranged between the first and third region.

This provides an image realisation surface with a range angles relative to the optical axis and distances from the focal point of the projection optics, thereby providing a wider range and variety in available virtual image depth.

Optionally the image realisation surface is a continuous shaped manifold. A free form surface is able to take any shape desired and therefore provides the widest range of angles from the optical axis and distances from the focal point of the projection optics.

Optionally the image realisation surface is controllably deformable. By controllably deforming the image realisation surface, the available range and resolution of virtual image depths is increased.

Alternatively, the imaging system further comprises a picture generation unit for generating the first source image to be rendered as the first display image on the display screen and projecting the first source image onto the image realisation surface.

The picture generation unit can account for predictable image distortion or degradation in the system and project a corrected image so as to ensure the quality of the final virtual image. Further, images generated by the picture generation unit will generally spread out with distance, the result being that images formed closer to the picture generation unit (and farther from the projection optics) will be smaller. This compensates for any magnification effect in the projection optics such that all virtual images are displayed on the display screen at a constant size, regardless of the distance at which the corresponding real images were formed on the image realisation surface.

Optionally the image realisation surface is an optical diffuser. This provides a surface on which the images from the picture generation unit can be selectively intercepted and formed.

Optionally the picture generation unit comprises a laser and a 2D scanning mirror for rendering the images on the diffuser.

Optionally the picture generation unit comprises a holographic unit to produce computer generated holograms for forming on the diffuser.

Optionally the picture generation unit comprises a light field unit to produce 3-dimentional light field images for forming on the at least one image realisation surface.

Optionally the picture generation unit comprises a holographic unit to produce computer generated holograms for rendering on the diffuser.

Optionally the picture generation unit is an OLED device. OLEDs provide a flexible and compact multi-colour display.

The projection of 3-dimentional images through the imaging system enables such images to be displayed on the display screen with the appropriate varying depth so as to produce a convincing representation of a real object.

Optionally the picture generation unit, image realisation device and projection optics are arranged along the optical axis of the imaging system. This bypasses the need for any redirecting optics which would otherwise complicate the imaging system as well as increase its overall weight and size.

Optionally the picture generation unit further comprises focussing optics. This allows for addition fine tuning or any necessary redirection of the resulting virtual images on the display screen.

Optionally the image realisation surface is located within the depth of focus of the picture generation unit. This ensures all formed images are in focus on the image realisation surface.

Other aspects of the invention will be apparent from the appended claim set.

Optionally the imaging system further comprises an ambient light sensor configured to adjust the brightness of the displayed virtual images. This sensor provides feedback to either the picture generation unit or the image generation layer in order to increase or decrease the brightness of the real images so as to affect the brightness of the corresponding virtual image as required.

Optionally, the imaging system can be activated and deactivated automatically as well as by a human input. This enables the imaging system to self-activate when pertinent information is available, or as and when desired by a user.

Optionally, the first point in a region is the middle point of the region.

Optionally, the display screen is a screen of a head-up display.

According to a further aspect of the invention, there is provided a vehicle comprising an imaging system as described in the preceding aspects.

According to another further aspect of the invention, there is provided a method for generating multi-depth virtual images on a display screen, the method comprising: forming a source image with an image realisation device, rendering a display image on the display screen, via a projection optics wherein the display image is a virtual image corresponding to the source image, and wherein the image realisation device comprises: a first image realisation surface, wherein the image realisation surface is an extended surface tilted relative to the optical axis such that a first point in a first region of the image realisation surface is at a first distance from the focal point of the projection optics and a second point in a second region of the image realisation surface is at a second different distance from the focal point of the projection optics, and a first source image formed on the first region and projected through the projection optics will render the first display image on the display screen at a first apparent depth and a second source image formed on the second region and projected through the projection optics will render the second display image on the display screen at a second apparent depth.

According to a further aspect of the invention, there is provided an imaging system for generating multi-depth virtual images on a screen of a head-up display, the imaging system comprising: an image realisation device for realising a first image, projection optics for rendering a second image on the screen of the head-up display, wherein the second image is a virtual image corresponding to the first image, the projection optics having an optical axis, and wherein the image realisation device comprises: a first image realisation surface, wherein the image realisation surface is an extended surface titled relative to the optical axis such that a first region of the image realisation surface is at a first distance from the focal point of the projection optics and a second region of the image realisation surface is at a second different distance from the focal point of the projection optics, and a first image realised on the first region and projected through the projection optics will render the second image on the screen of the head-up display at a first apparent depth and a first image realised on the second region and projected through the projection optics will render the second image on the screen of the head-up display at a second apparent depth.

According to a further aspect of the invention, there is provided an imaging system for generating multi-depth virtual images on a display screen, the imaging system comprising: an image realisation device for realising a first image, projection optics for rendering a second image on the display screen, wherein the second image is a virtual image corresponding to the first image, the projection optics having an optical axis, and wherein the image realisation device comprises: a first image realisation surface, wherein the image realisation surface is an extended surface titled relative to the optical axis such that a first region of the image realisation surface is at a first distance from the focal point of the projection optics and a second region of the image realisation surface is at a second different distance from the focal point of the projection optics, and a first image realised on the first region and projected through the projection optics will render the second image on the display screen at a first apparent depth and a first image realised on the second region and projected through the projection optics will render the second image on the display screen at a second apparent depth.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In an aspect of the invention the apparatus and the display are installed in a vehicle, such as a motor vehicle. Whilst the following description is described with reference to a head-up display (HUD) of a motor vehicle, the disclosure, and concepts described herein are applicable to other forms of HUD (for example those installed on other forms of vehicles or wearable platforms such as helmets or goggles), as well as displays in general.

Particularly, but not exclusively, the disclosure relates to an apparatus for creating and projecting multi-dimensional 3-D augmented reality images onto a display screen, such as a windscreen if it is installed for use in a confined environment such as a vehicle which can be operated on land (on/off road or track), under or over sea, in air or space. The examples can be, but are not limited to, cars, buses, lorries, excavators, exoskeleton suit for heavy-duty tasks, motor-cycles, trains, theme park rides; submarines, ships, boats, yachts, jet-skies for see vehicles; planes, gliders for air crafts, spaceships, shuttles for space crafts.

Furthermore, the technology can be installed/integrated in a mobile platform such as a driver's/operator's head/eye protection apparatus such as a helmet or goggles. Therefore, any activity, which involves wearing protective helmets/goggles, can benefit from this technology. These can be worn by, but are not limited to, motorcyclist/cyclist, skiers, astronauts, exoskeleton operators, military personnel, miners, scuba divers, construction workers. Moreover, it can be used in a standalone environment for game consoles, arcade machines and with a combination of an external 2D/3D display it can be used as a simulation platform. Also, it can be used in institutions and museums for educational and entertainment purposes.

It is also possible to use the described invention in scenarios, where a non see-through screen is present, such as a virtual reality system.

Figure 1A:
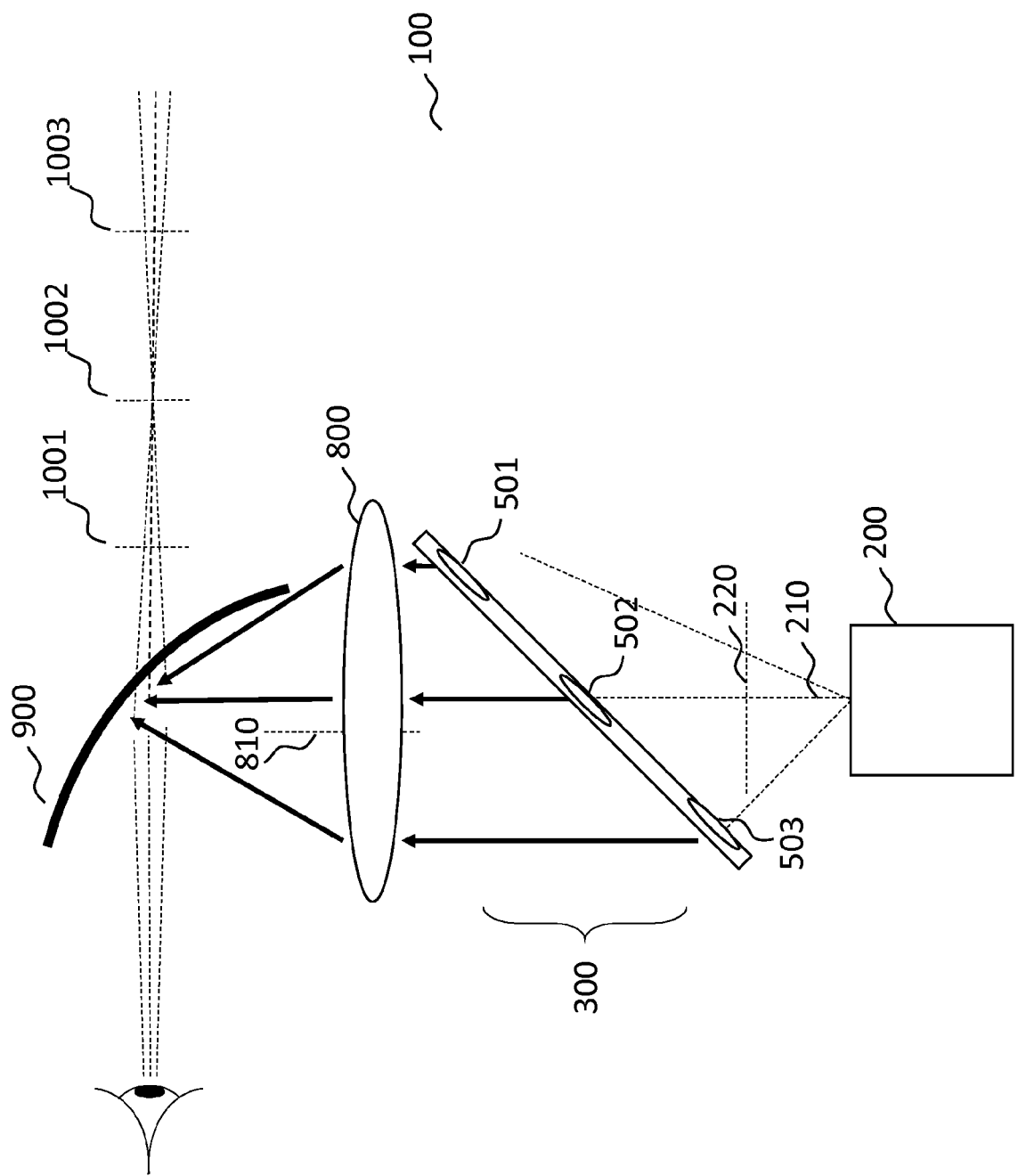
FIGS. 1a, 1b and 1c are a schematic illustration of an apparatus according to an embodiment of the invention.
Figure 1B:
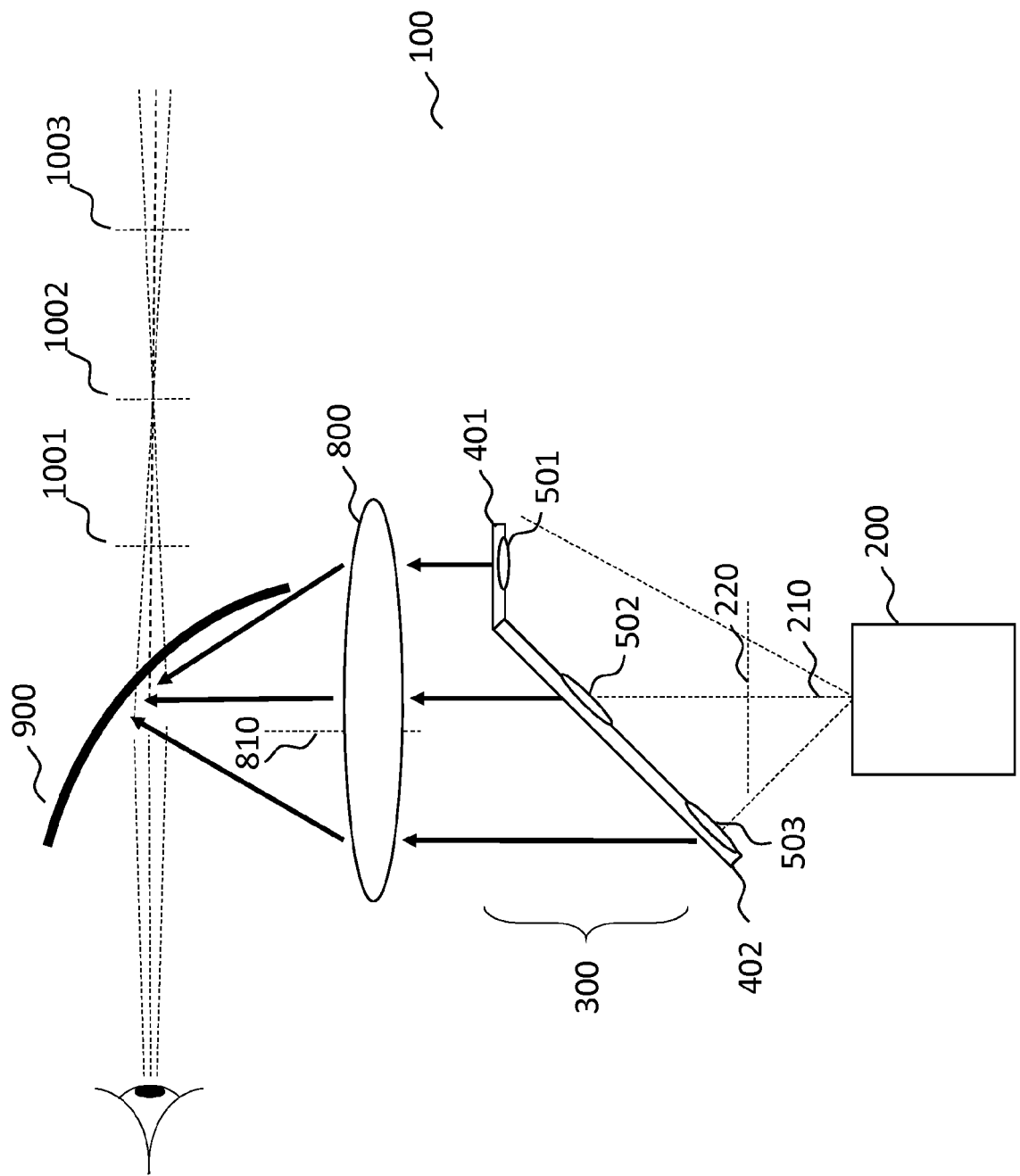
Figure 1C:
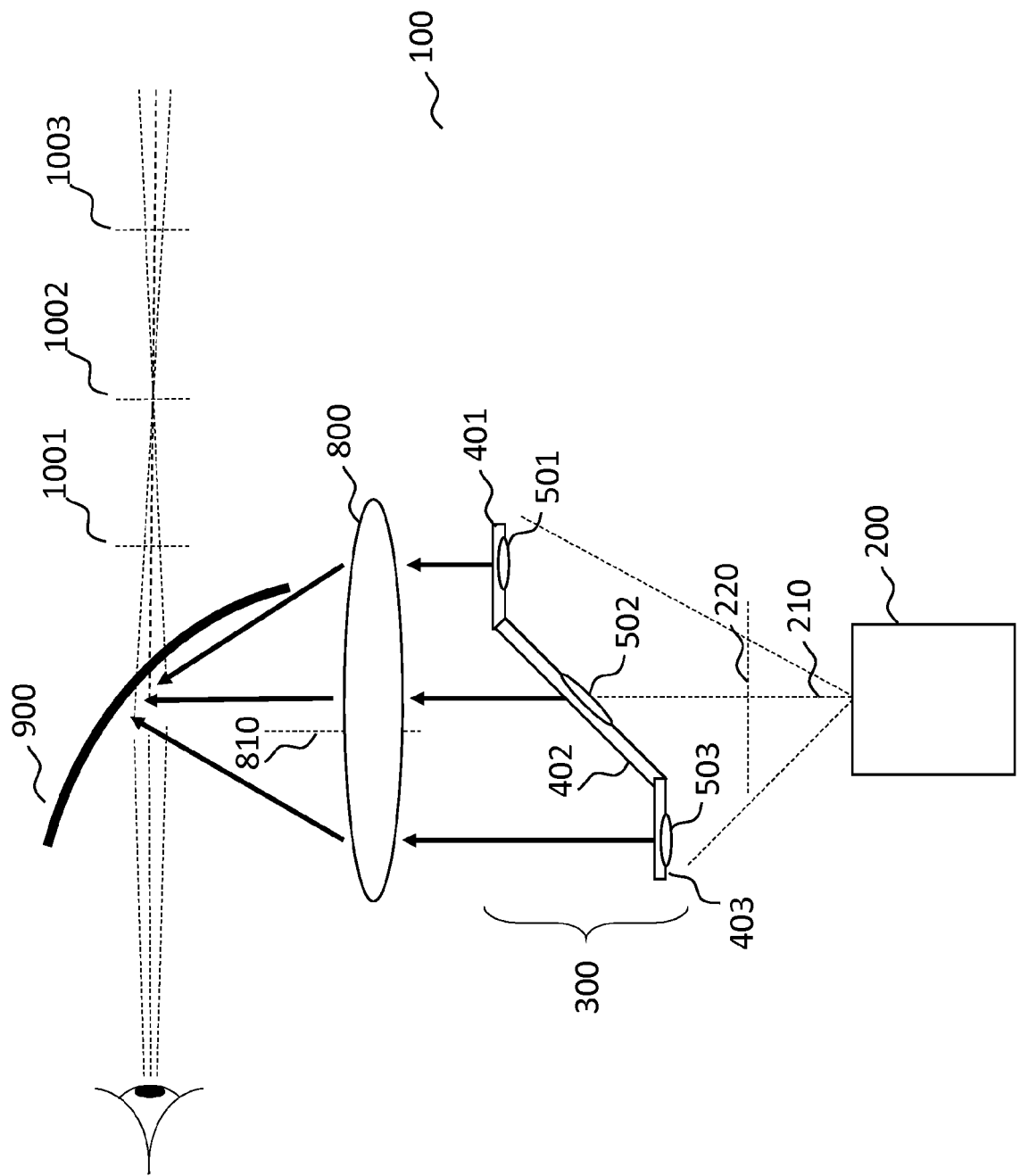

FIGS. 1a, 1b and 1c show various embodiments of an imaging system for realising images at multiple apparent depths on a display.

FIG. 1a shows an imaging system 100 made up of a picture generation unit 200 having a projection axis 210. The picture generation unit 200 projects light onto the image realisation device 300. The real images 501-503 formed in the image realisation device 300 are directed through projection optics 800 having optical axis 810 onto the screen 900 of a head-up display to form display images.

The path of the light from the picture generation unit 200, through the image realisation device 300 and the projection optics 800 and onto the screen 900 of the head-up display is referred to as the optical path. The skilled person would understand that any number of intervening reflectors/lens or other optical components may be placed along the optical path between the picture generation unit 200, the image realisation device 300 and the projection optics 800, to manipulate the optical path as necessary (for example, to minimize the overall size of the imaging system 100).

The form and functionality of the image realisation device 300 are described in further detail below with reference to FIGS. 2 and 3.

Returning to FIG. 1a, in use, the source images for example, real images 501-503 are formed in the image realisation device 300. As the image realisation device 300 is an extended surface which is tilted relative to the optical axis such that images formed on different portions of the image realisation device are at different distances from the focal point of the projection optics 800. As such each real image 501-503 results in a virtual image 1001-1003 having a different focus (or perceived depth) visible on the screen 900 of the head-up display.

Accordingly, the apparatus, due to the tilted extended surface allows for virtual images to be generated at the HUD at a desired depth by forming the image at different portions of the image realisation device 300.

In FIG. 1a the image realisation device 300 is a single extended surface which is tilted relative to the optical axis. FIGS. 1b and 1c show different embodiments of the imaging system 100 in which the image realisation device 300 comprises different shaped surfaces on which the real images 501-503 are formed.

In FIG. 1b there is shown the imaging system 100 as described with reference to FIG. 1a. In FIG. 1b the image realisation device 300 comprises a surface having a first portion 401 which is perpendicular to the optical axis and a second portion 402 which is tilted at a first angle relative to the optical axis. Whilst in FIG. 1b the first portion 401 is shown to be perpendicular to the optical axis, in further embodiments, the second portion may be at any angle relative to the optical axis, which is different to the first angle.

As shown in FIG. 1b two real images 502 503 are formed on the second portion 402 of the image realisation device 300 and another real image 501 is formed on the first portion 401 of the image realisation device 300. As described above, with reference to FIG. 1a, as the real images 501-503 are formed at different distances from the focal point of the projection optics 800 they result in a virtual image 1001-1003 having a different focus (or perceived depth) visible on the screen 900 of the head-up display.

In FIG. 1c the image realisation device 300 comprises a surface having a second portion 402 which is tilted at a first angle relative to the optical axis, and first and third portions 401, 403 which are perpendicular to the optical axis. Whilst in FIG. 1c the first portion 401 and third portion 403 are shown to be perpendicular to the optical axis, in further embodiments, the second portion may be at any angle relative to the optical axis, which is different to the first angle.

Figure 2:
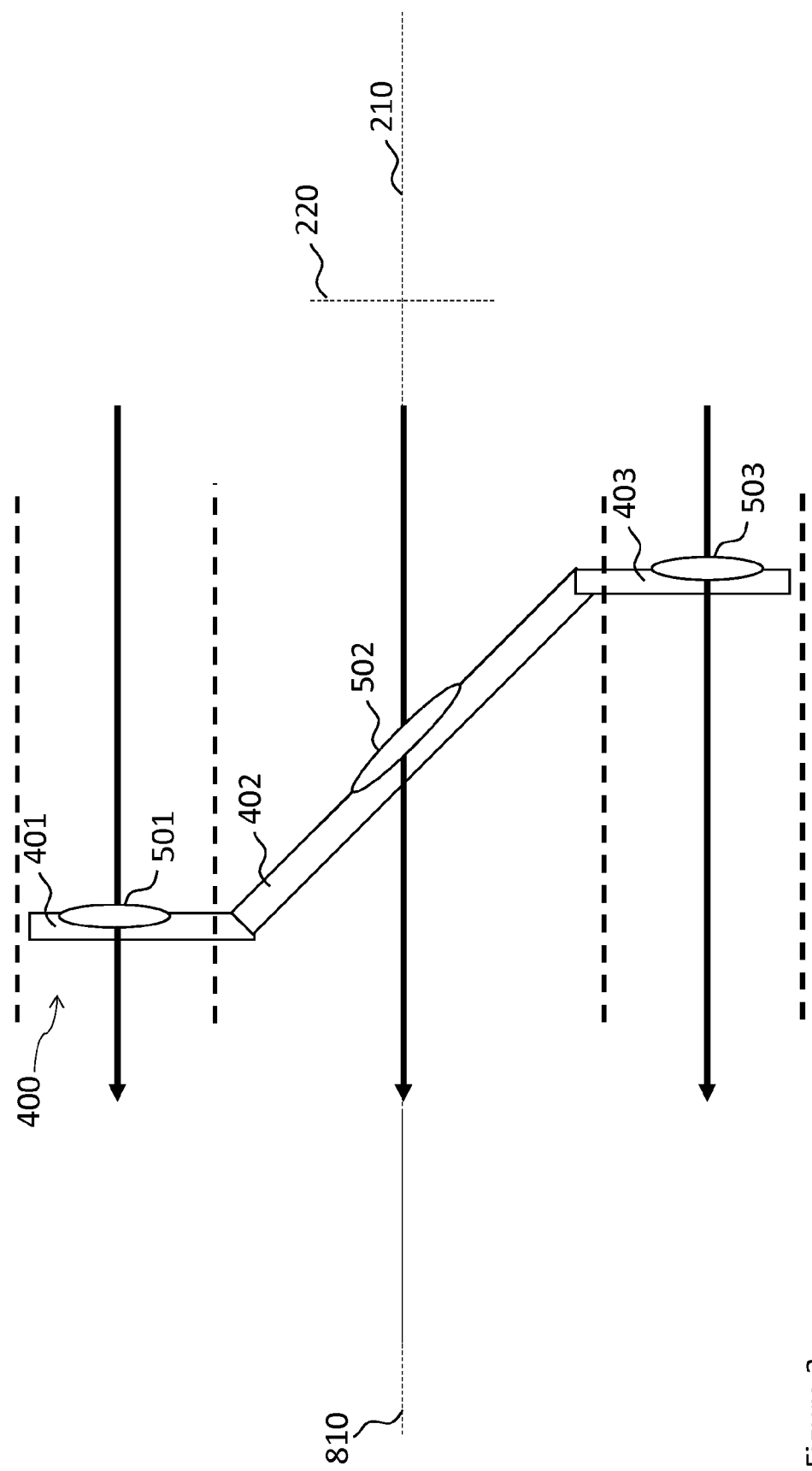
FIG. 2 is an embodiment of an image realisation device for use in the apparatus of FIG. 1.

FIG. 2 shows an embodiment of the image realisation device 300 of FIG. 1c in more detail. The image realisation device 300 is located between the picture generation unit 200 and the projection optics 800, with each of the image realisation device 300, picture generation unit 200 and projection optics 800 spaced apart and centred on a common axis (i.e. projection axis 210 equals optical axis 810 which together represent the optical path).

The image realisation device 300 is formed of a single, extended, image realisation surface 310. The image realisation surface 310 is an optical diffuser 400 having three regions 401, 402 and 403. Regions 401 and 403 are oriented parallel to each other and perpendicular to the projection axis 210 of the picture generation unit 200.

Region 401 is spaced apart from region 403 along both of the projection axis 210 and lateral axis 220, allowing for images projected by the picture generation means 200 to be formed at different distances along the optical axis 810 (i.e. different distances from the focal point of the projection optics 800).

Region 402 extends between portions 401 and 403 to define a complete surface, region 402 being slanted, or tilted, relative to regions 401, 403 and the projection axis 210. The slope of region 402 allows for an image to be formed across a continuous range of distances from the focal point of the projection optics 800.

Whilst the illustrated embodiment is limited to three regions arranged as described, the skilled person would appreciate that the image realisation surface 310 may be formed by any plurality of regions, having any suitable relative orientations and positioning provided the image realisation surface 310 presented to the picture generation unit 200 spanned a range of distances from the focal point of the projection optics 800.

The picture generation unit 200 is formed of a laser and a 2D scanning mirror though the skilled person would appreciate that any suitable light source and imaging means may be used provided they were capable of forming one or more images on the optical diffuser 400. Accordingly, in an embodiment the picture generation unit 200 is a holographic unit which produces computer generated holograms for forming on the image realisation surfaces. In an alternative embodiment, the picture generation unit 200 is a light field unit to produce 3-dimentional light field images for forming on the image realisation surfaces.

In an embodiment, the picture generation unit 200 further includes imaging optics for manipulating the real images 501-503 onto the relevant region of the image realisation device 300.

The projection optics 800 are formed of a Fresnel lens, though any suitable focussing optics may be employed.

In operation, the picture generation unit 200 projects a series of real images 501-503 onto the optical diffuser 400 such that a separate real image 501-503 is formed on each of the three optical diffuser regions 401-403.

Due to the arrangement of the diffuser regions 401-403 along the optical axis 810 and their differing distances from the focal point of the projection optics 800, each real image 501-503 is formed at a different distance from the focal point of the projection optics 800 such that when directed on to the screen 900 of the head-up display via the projection optics 800, each real image 501-503 appears as a virtual image 1001-1003 having a distinct level of focus (or perceived depth).

The set distance of optical diffuser regions 401 and 403 from the focal point of the projection optics 800 allows for a discrete difference in associated virtual image depth, whilst the tilted surface of optical diffuser region 402 provides a continuous change in distance from the focal point and thus a continuous change in the resulting virtual image depth. As such the tilted surface allows for the projection of the virtual image at the HUD at any number of depths by rendering the real image at the appropriate location of the tilted surface.

In an alternative embodiment, the image realisation surface 310 is continuous and slanted relative to the projection axis 210, such that the normal to the first optical diffuser surface 310 is at a constant angle.

As with optical diffuser region 402 described above, this allows the real images 501-503 to be projected at a continuous range of distances from the focal point of the projection optics 800 depending on which region of the image realisation surface 310 they are formed. This provides a continuous range of focuses/perceived depths of the resultant virtual images 1001-1003 displayed on the screen 900 of the head-up display.

Figure 3:
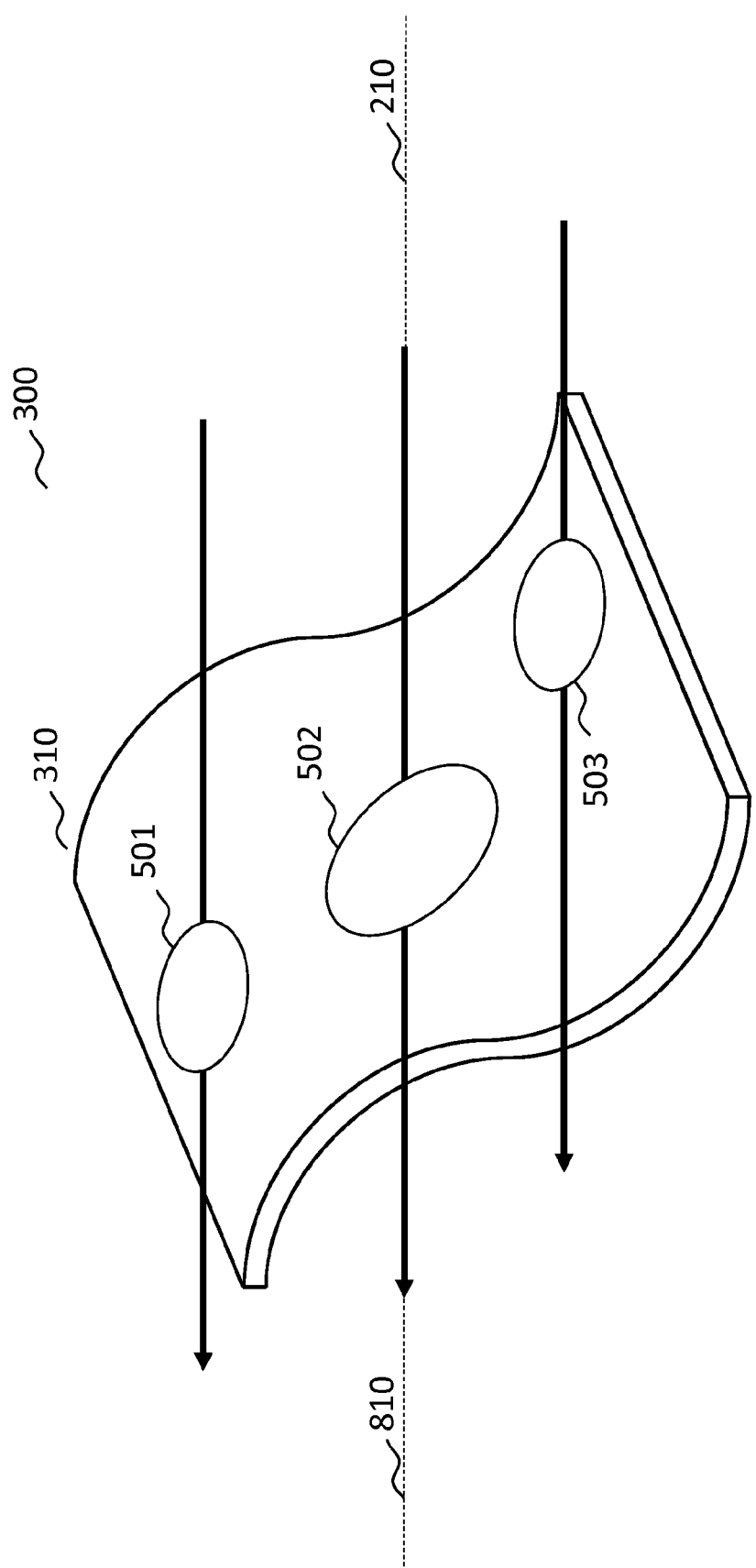
FIG. 3 is a further embodiment of an image realisation device for use in the apparatus of FIG. 1.

FIG. 3 depicts a further embodiment in which the image realisation surface is a curved or freeform plane such that the normal of the image realisation surface continuously changes its angle relative to the projection axis 210 between different regions 401-403 of the optical diffuser 400.

In an embodiment, the optical diffuser arrangement is limited in extent along projection axis 210 such that the projected real images 501-503 are all within the focal depth of the picture generation units, allowing for each of the real images 501-503 to be sharp.

In alternative embodiment, the image realisation surface 310 is an image generation layer rather than an optical diffuser 400. In an embodiment, the image generation layer is an electroluminescent OLED, though any suitable image generation means may be employed.

The image generation layer is arranged relative to the projection optics 800 in the same manner as the optical diffuser of the earlier embodiments.

Rather than forming images projected by the picture generation unit 200, the image generation layer generates real images 501-503 by itself, which are then projected through the projection optics. This removes the need for a picture generation unit.

In a further embodiment, the image realisation device 300 is formed of both the optical diffuser 400 and the image generation layer, with the image generation layer positioned along the optical path and the optical axis 810 between the optical diffuser 400 and the projection optics 800. This provides for a system with two modes of operation, wherein each mode may be adapted to operate in different range of ambient light conditions.

In use, when the picture generation unit 200 is being employed to form images on the optical diffuser 400, the image generation layer is in a transparent, deactivated state, thereby allowing the real image 501-503 to pass through to the projection optics 800.

Alternatively, when the image generation layer is used to generate the real images 501-503, both the picture generation unit 200 and the optical diffuser 400 are in a deactivated/idle state to save power.

In an alternative embodiment, the image generation layer is positioned along the projection axis 210 between the optical diffuser 400 and the picture generation unit 200. In this embodiment, the image generation layer is once again in a transparent state when the optical diffuser 400 and picture generation unit 200 are in use.

In another mode of operation, the image generation layer is used to generate the real images 501-503 and the optical diffuser 400 transitions to a transparent state so as to allow the real images 501-503 pass to the mirror array without interference. The overlaying of the optical diffuser 400 and image generation layer in this way allows for a dual mode system without requiring a second set of projection optics 800.

Figure 4:
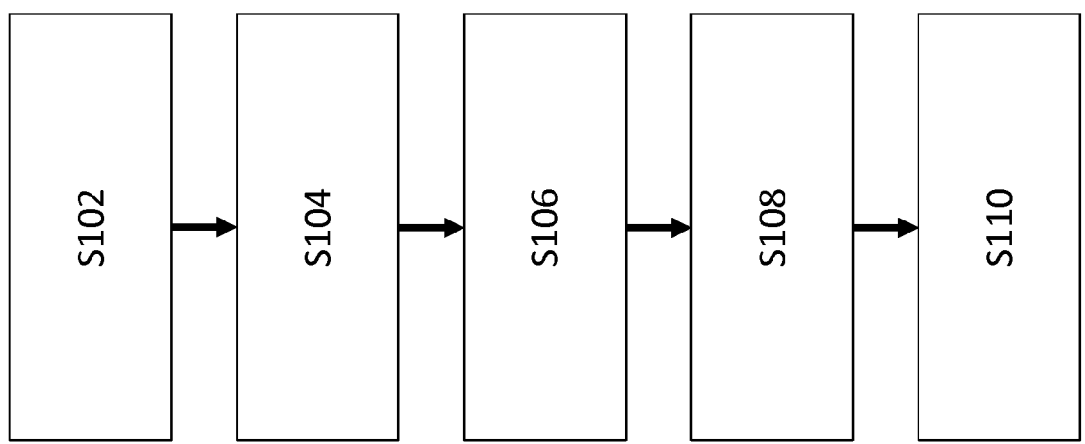
FIG. 4 is a flow chart of the process for generating the image to be rendered on the screen of the head-up display.
Figure 5:
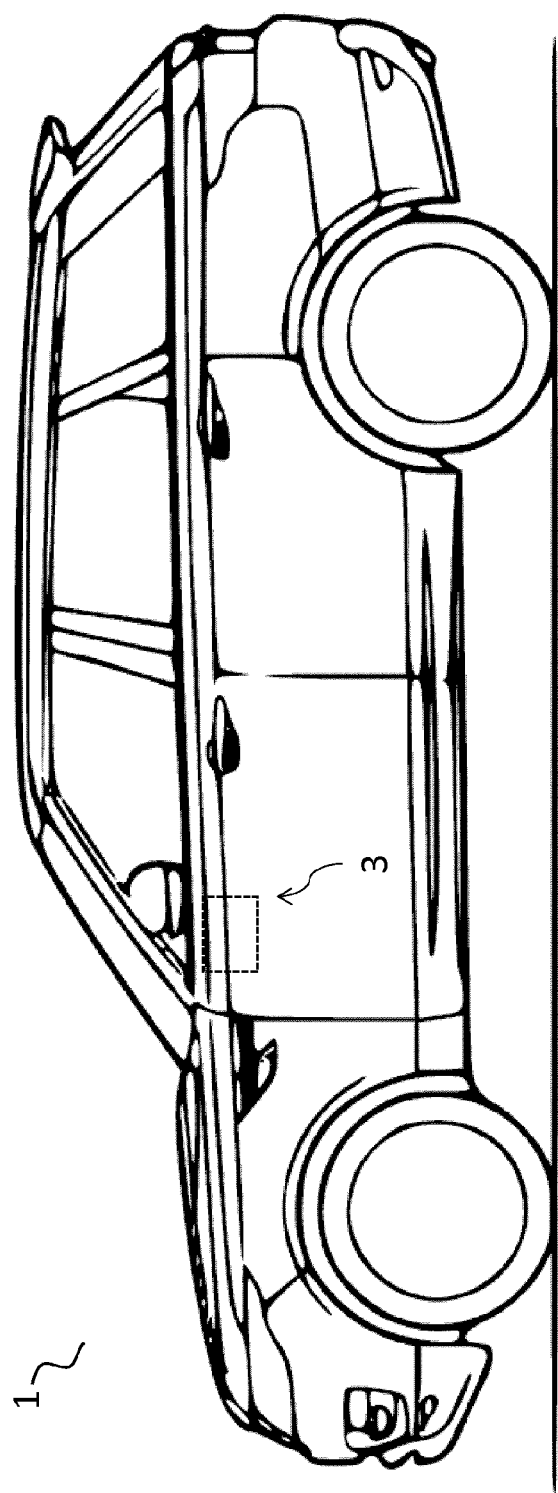
FIG. 5 is a vehicle according to an embodiment of the invention.

FIG. 4 is a flow chart of the process for generating the image to be rendered on the screen of the head-up display.

In an aspect of the invention the apparatus generates a virtual image which is displayed on the HUD, the HUD being a windscreen of the vehicle. As is known the windscreen of a vehicle is a geometrically distorted shape i.e. it is not flat. Accordingly, an image that is projected onto the windscreen will be distorted, the level of distortion being affected by various factors such as the shape of the windscreen, and the average distance of the windscreen from the projected image.

The apparatus described herein is able to generate an image which can be presented at various depths. Whilst the generation of the images at multiple depths on the HUD provides many advantages over a flat, single depth, image the ability to correct for factors such as the curvature of the windscreen results in further improvements in terms of depth control and image manipulation.

Advantageously in order to reduce the effect of the distortion in an aspect of the invention the windscreen distortion is corrected for by the image generation unit using software to pre-distort the image such that the image rendered on the windscreen is free from any distortions created by the windscreen. Such a software based correction eliminates the need for bulky correction optics and furthermore provides a higher degree of flexibility which can adapt to different windscreens.

The images to be presented on the HUD are generated by a picture generation unit. The picture generation unit defining the image to be displayed by the HUD. By way of example the image may comprise information regarding the car conditions and further information relating to navigation.

The term picture generation unit refers to the apparatus which determines and generates the base image to be rendered on the HUD. The process described herein is applicable to any suitable form of picture generation apparatus.

The picture generation unit comprises an image source which generates the image to be displayed on the HUD. The image source in an embodiment is a light engine, or OLED display or any suitable source which generates the image to be displayed. The image source comprises a software driver configured to determine and generate the image on the image source.

The software driver comprises a component which determines the content to be displayed. The process of the generation of content is known and in an aspect is performed using known means.

The driver further comprises a distortion module, the distortion module configured to apply a distortion to the generated image, the distortion calculated such that when the image is displayed on the HUD/windscreen the image appears undistorted to the end user.

At step S102 the windscreen is modelled as a mirrored surface. At step S102 the shape and gradient of the windscreen is determined. In an embodiment, as the shape of the windscreen is typically constant for a particular make and model of a vehicle it is pre-programmed.

At step S104 the image to be displayed on the HUD is taken as reference input image. Such an image will typically change several times per second.

At step S106 the input image is separated for each colour channel of the image to create an image per colour channel.

At step S108 for each colour channel image, for each pixel of the image the position of the pixel as visualised by a viewer located at a distance away from the windscreen surface is determined. This is determined by using ray reflection in order to determine the position of the pixel based on the average distance of the input pixel (as per step S106) the reflection surface of the windscreen (as per step S102) and the average distance between the rendered image and the windscreen, the image depth.

Therefore, at step S108 the level of distortion for each colour channel image, as a result of the windscreen and the physical distances, is calculated. This results in a distorted image (with the level of distortion being dependent on the physical parameters) for each colour channel. This can be achieved by monitoring the displacements of certain predefined points on a distorted image and fitting them to obtain the related distortion parameters.

At step S110 the individual distorted colour channel images are combined. The combined image is the resultant pre-distortion image as the projection of the pre-distortion image will result in the input image (as per step S104) being displayed.

As such the process provides an improved methodology for ensuring that the generated image is free from distortion.

FIG. 8 illustrates a vehicle 1 comprising the apparatus 3 of FIGS. 1 to 3. The apparatus 3 may be embodied in an imaging system.

The invention claimed is:

1. An imaging system for generating multi-depth virtual images on a display screen, the imaging system comprising:
   an image realisation device for forming a source image,
   projection optics for rendering a display image on the display screen, wherein the display image is a virtual image corresponding to the source image, the projection optics having an optical axis, and
   wherein the image realisation device comprises:
     an image realisation surface, wherein the image realisation surface is an extended surface, wherein at least a portion of the image realisation surface is tilted relative to the optical axis such that mid-point in a first region of the image realisation surface is at a first distance along the optical axis from a focal point of the projection optics and mid-point in a second region of the image realisation surface is at a second different distance along the optical axis from the focal point of the projection optics,
     a first source image formed on the first region and projected through the projection optics will render a first display image on the display screen at a first apparent depth and a second source image formed on the second region and projected through the projection optics will render a second display image on the display screen at a second apparent depth; and
     wherein the image realisation surface is controllably deformable to increase an available range and resolution of the first and second display image apparent depths.

2. The imaging system according to claim 1, wherein the image realisation surface is translatable along the optical axis of the projection optics.

3. The imaging system according to claim 1, wherein the image realisation surface is rotatable and tiltable relative to the optical axis of the projection optics.

4. The imaging system according to claim 1, wherein the image realisation surface is capable of generating the first display image.

5. The imaging system according to claim 1, wherein the image realisation surface is a flat surface having a constant tilt relative to the optical axis.

6. The imaging system according to claim 1, wherein the image realisation surface comprises a plurality of discrete regions.

7. The imaging system according to claim 6, wherein each region of the image realisation surface is at a different angle to the optical axis to that of one or more of the other regions.

8. The imaging system according to claim 1, wherein the image realisation surface is a continuous shaped manifold.

9. The imaging system according to claim 1, further comprising a picture generation unit for generating the first source image to be rendered as the first display image on the display screen and projecting the first source image onto the image realisation surface.

10. The imaging system according to claim 9, wherein the image realisation surface is an optical diffuser.

11. The imaging system according to claim 9, wherein the picture generation unit comprises a holographic unit to produce computer generated holograms for forming on the first and second regions of the image realisation surface.

12. The imaging system according to claim 9, wherein the picture generation unit comprises a light field unit to produce 3-dimensional light field images for forming on the first and second regions of the image realisation surface.

13. The imaging system according to claim 9, wherein the picture generation unit, image realisation device and projection optics are arranged along an optical path of the imaging system.

14. The imaging system according to claim 9, wherein the picture generation unit is configured to generate an input image to be rendered on the display screen as the display image, wherein the input image is adjusted to compensate for any distortion due to the display screen.

15. The imaging system according to claim 1, wherein the imaging system can be activated and deactivated automatically as well as by a human input.

16. The imaging system according to claim 1, wherein the display screen is a screen of a head-up display.

17. A vehicle comprising the imaging system of claim 1.

18. An imaging system for generating multi-depth virtual images on a display screen, the imaging system comprising:
 an image realisation device for forming a source image,
 projection optics for rendering a display image on the display screen, wherein the display image is a virtual image corresponding to the source image, the projection optics having an optical axis, and
 wherein the image realisation device comprises:
  an image realisation surface, wherein the image realisation surface is an extended surface, wherein at least a portion of the image realisation surface is tilted relative to the optical axis such that mid-point in a first region of the image realisation surface is at a first distance along the optical axis from a focal point of the projection optics and mid-point in a second region of the image realisation surface is at a second different distance along the optical axis from the focal point of the projection optics,
 a first source image formed on the first region and projected through the projection optics will render a first display image on the display screen at a first apparent depth and a second source image formed on the second region and projected through the projection optics will render a second display image on the display screen at a second apparent depth; and
 wherein the image realisation surface is controllably deformable and has a plurality of discrete regions that includes first, second and third regions wherein the first and third region are substantially perpendicular to the optical axis.

19. The imaging system according to claim 18, wherein the second region is arranged between the first and third region.

20. A method for generating multi-depth virtual images on a display screen, the method comprising:
 forming a source image with an image realisation device,
 rendering a display image on the display screen, via a projection optics wherein the display image is a virtual image corresponding to the source image, and
 wherein the image realisation device comprises:
  an image realisation surface, wherein the image realisation surface is an extended surface, wherein at least a portion of the image realisation surface is tilted relative to the optical axis such that a mid-point in a first region of the image realisation surface is at a first distance along the optical axis from a focal point of the projection optics and a mid-point in a second region of the image realisation surface is at a second different distance along the optical axis from the focal point of the projection optics,
 a first source image formed on the first region and projected through the projection optics will render a first display image on the display screen at a first apparent depth and a second source image formed on the second region and projected through the projection optics will render a second display image on the display screen at a second apparent depth; and
 wherein the image realisation surface is controllably deformable to increase an available range and resolution of the first and second display image apparent depths.

* * * * *